Figure 1:
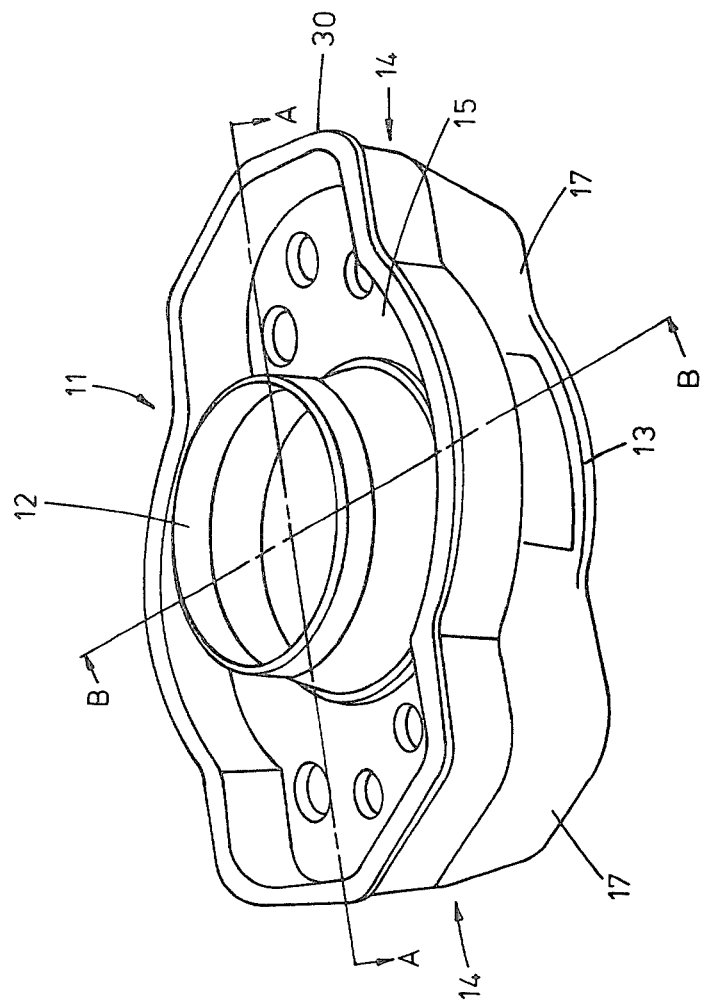

United States Patent [19]

Cocking

[11] Patent Number: 4,484,491
[45] Date of Patent: Nov. 27, 1984

[54] TRANSMISSION SYSTEMS

[75] Inventor: Harry Cocking, Stoford, Nr. Yeovil, England

[73] Assignee: Westland plc, Somerset, England

[21] Appl. No.: 388,637

[22] Filed: Jun. 15, 1982

[30] Foreign Application Priority Data

Jun. 17, 1981 [GB] United Kingdom ............... 8118927

[51] Int. Cl.³ .................. F16H 57/02; B64D 35/00; B64C 11/00; B64C 27/46
[52] U.S. Cl. .................. 74/606 R; 74/467; 74/661; 74/665 A; 74/410; 416/60; 416/170 R; 244/60
[58] Field of Search ............ 416/170, 148, 60, 170 B; 74/606 R, 661, 665 A, 665 B, 665 C, 665 P, 467, 410, 607; 244/60

[56] References Cited

U.S. PATENT DOCUMENTS

| 1,552,859 | 9/1925 | Ljungstrom | 74/410 |
| 2,520,887 | 8/1950 | Miller, Jr. | 416/170 B |
| 2,771,143 | 11/1956 | Campbell | 416/170 B |
| 3,188,884 | 6/1965 | Bancroft | 416/170 B |
| 3,255,825 | 6/1966 | Mouille et al. | 416/170 B |
| 3,333,482 | 8/1967 | Wildhaber | 74/410 |
| 3,374,687 | 3/1968 | Vogt | 74/606 |
| 4,177,693 | 12/1979 | Ivanko et al. | 74/665 A |
| 4,216,925 | 8/1980 | Mendiberri | 74/665 K |
| 4,302,154 | 11/1981 | Mack | 416/170 B |

FOREIGN PATENT DOCUMENTS 910185 11/1962 United Kingdom ................. 74/661

Primary Examiner—George H. Krizmanich
Assistant Examiner—Michael D. Bednarek
Attorney, Agent, or Firm—Larson and Taylor

[57] ABSTRACT

A helicopter transmission system includes a gearbox comprising a gearcase (11) having a hollow stub axle (12) by which operational loads are transmitted from a main sustaining rotor to a fuselage structure. One or more input speed reducing gear trains (20, 21, 22, 23) are individually supported in hollow lobe portion(s) (14) supported from the axle (12), the or each lobe portion having an individual lubricating oil sump (18) and circulating means (31) adapted to circulate lubricating oil to the respective gear trains. Preferably, interconnecting means (33) are provided to connect the respective individual sumps, and valve means (32, 35) are adapted to maintain a flow of lubricating oil in the event of a loss of oil from one of the sumps.

9 Claims, 6 Drawing Figures

TRANSMISSION SYSTEMS

DESCRIPTION OF INVENTION

This invention relates to transmission systems and particularly to transmission systems for driving a helicopter main sustaining rotor.

In modern turbine driven helicopters, the transmission system is required to transmit power from one or more high speed inputs to the much slower output rotor drive shaft, and usually through an angle of about 90 degrees. Multi-stage gearing is necessary to achieve the desired speed reduction and each required stage adds weight and complication.

Furthermore, all operational rotor loads including lift loads are normally transmitted to the fuselage through the wall structure of a gear case. Since the wall structures usually have complex shapes, the load paths themselves are complex and inherent difficulties in analysing such complex shapes and the need to keep deflections to a minimum in order to maintain correct gear alignment usually mean that the gear case is extremely heavy.

Accordingly, in one aspect, the invention provides a gear case for a helicopter transmission system, including a hollow stub axle adapted during operation to transmit operational loads from a main sustaining rotor to a fuselage structure, the stub axle including a generally radially extending web member supporting a hollow lobe portion adapted to house and support a speed reducing gear train.

The web member may be located intermediate the ends of the stub axle and the lobe portion may include a lower boundary wall extending radially from the stub axle and an outer curved side wall joining the web member and the lower wall to define, with part of the external surface of the stub axle, a sump adapted during operation to contain lubricating oil for the speed reducing gear train.

The web member, the lower boundary wall and the curved side wall may be formed integral with the stub axle.

In another aspect, the invention provides for a helicopter transmission system, a gearbox comprising a gearcase and a speed reducing gear train adapted to drive a main sustaining rotor from an external power source, the gearcase including a hollow stub axle having attachment means at a lower end thereof for connection to a fuselage structure, wherein the stub axle includes a generally radially extending web member supporting a hollow lobe portion, the gear train including an input speed reducing gear stage located in the lobe portion and meshed with an output combining gear rotationally mounted externally of the stub axle adjacent an upper end thereof, the combining gear having attachment means for connection to a rotor hub of the main sustaining rotor whereby operational loads are transmitted through the stub axle.

The speed reducing gear train may comprise a first stage spiral bevel reduction gear and a multi-pinion output stage meshed with the combining gear. Preferably the meshed pinions and the combining gear comprise a conformal tooth form, and the output stage has a reduction ratio of 10:1 or greater.

The stub axle may comprise an upright frustum of a cone.

In another aspect, the invention provides for a helicopter transmission system, a gearbox adapted to drive a main sustaining rotor and including a plurality of speed reducing gear trains each connected to an external power source, the gearbox comprising a gearcase including, for each gear train, a hollow lobe portion having an individual lubricating oil sump and circulating means adapted during operation to circulate lubricating oil from the sumps to the respective gear trains.

The circulating means may include a pump operatively associated with each of the sumps. Preferably, a non-return valve is located downstream of each pump, the outlet from the valves being connected to a common manifold adapted during operation to supply lubricating oil to the respective gear trains. Valve means may be provided to selectively control the flow of lubricating oil to the respective gear trains.

In yet another aspect the invention provides, for a helicopter transmission system, a gearbox comprising a gearcase including a hollow stub axle adapted during operation to transmit operational loads from a main sustaining rotor to a fuselage structure the stub axle including at least one generally radially extending web member supporting a plurality of hollow lobe portions, each lobe portion including an individual sump containing lubricating oil for a speed reducing gear train.

In yet another aspect the invention provides, for a helicopter transmission system, a gearbox including a gearcase and a speed reducing gear train adapted to drive a main sustaining rotor from two or more external power sources, the gearcase including a hollow stub axle having attachment means at a lower end thereof for connection to a fuselage structure wherein the stub axle includes at least one generally radially extending web member supporting a plurality of hollow lobe portions equal in number to the number of power sources, the gear train including for each external power source an input speed reducing gear train stage located in its respective lobe portion, each input speed reducing gear train stage being meshed with a common output combining gear rotationally mounted externally of the stub axle adjacent an upper end thereof and having attachment means for connection to a rotor hub of the main sustaining rotor, each lobe portion including an individual sump containing lubricating oil for the speed reducing gear train.

Figure 2:
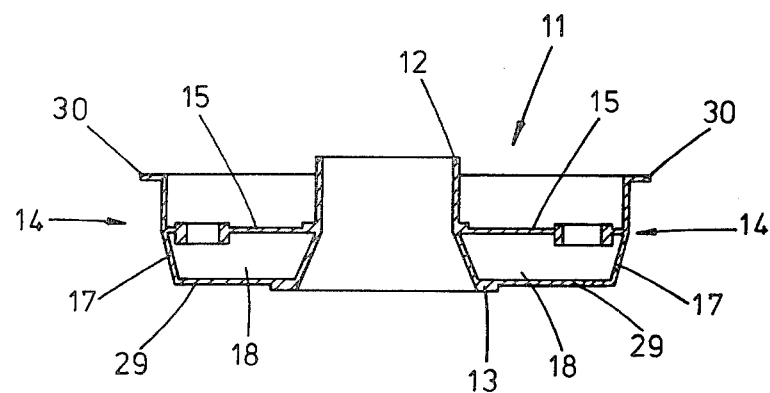
Figure 3:
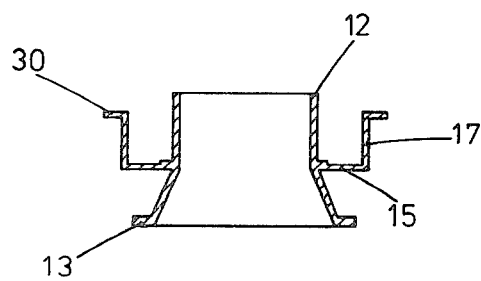
Figure 4:
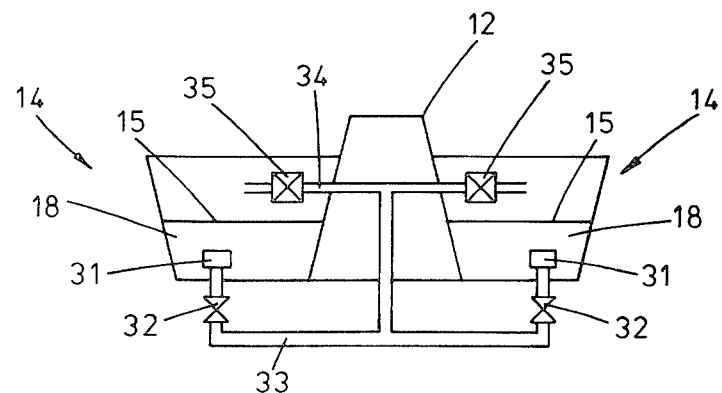
Figure 5:
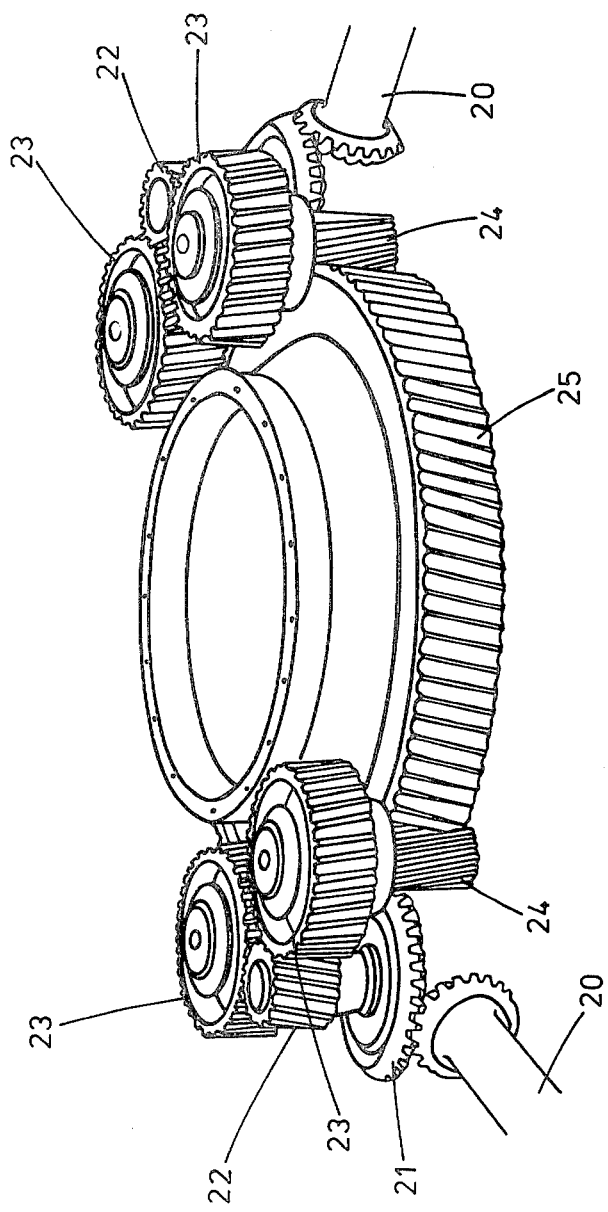
Figure 6:
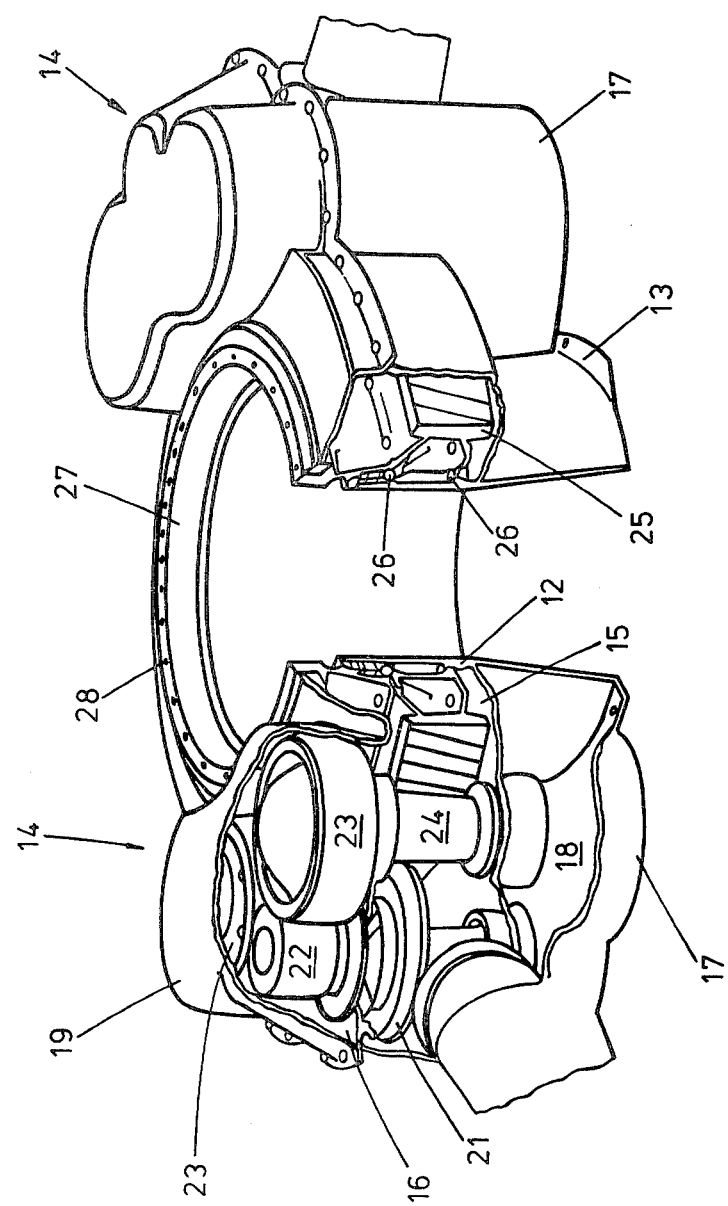

The invention will now be described by way of example only and with reference to the accompanying drawings in which, FIG. 1 is a perspective external view of a gearcase for a helicopter transmission system constructed according to the invention, FIG. 2 is a sectioned view taken along lines A—A of FIG. 1, FIG. 3 is a sectioned view taken along lines B—B of FIG. 1, FIG. 4 is a schematic illustration of a lubricating system installed in the gearcase of FIGS. 1 to 3 inclusive, FIG. 5 is a perspective view of a preferred gear train for use in a helicopter transmission system, and FIG. 6 is a perspective part-sectioned illustration showing the gear train of FIG. 4 incorporated in the gearcase of FIGS. 1 to 3.

Referring now to FIGS. 1 to 3, a gearcase 11 for a helicopter transmission system comprises a central hollow steel stub axle 12 having a lower flanged portion 13 adapted for attachment to a helicopter fuselage. As will be clear from FIG. 2, the axle 12 has a lower portion shaped as a frustum of a cone with the largest diameter and lowermost and blended with a parallel sided upper portion. In an un-illustrated embodiment, the axle 12 consists entirely of a hollow frustum of a cone.

The illustrated gearcase is intended for use with a two-engined installation, and two diametrically opposed hollow lobe portions 14 are supported by the axle 12 and adapted to house respective speed reducing and load dividing gear stages (not shown). Each lobe portion 14 is supported by an apertured web 15 extending generally radially from an external surface of the stub axle 12. The web 15 is located intermediate the ends of the axle 12 and, in the illustrated embodiment is formed integral therewith. A curved side wall 17 and a lower boundary wall 29 extending radially outwardly from the lower end of stub axle 12 complete each lobe portion 14 and, in combination with the respective part of the axle 12, define a sump area 18. The side wall 17 extends upwardly from the web 15 to terminate in an upper flange 30 and, as illustrated in FIGS. 1 and 3, a reduced radial length portion of web 15 and an upper portion of side wall 17 extends around the sides of the stub axle 12 to join the lobe portions 14. Preferably, the axle 12, web 15, side wall 17 and lower wall 29 are manufactured as an integral casting, however, the web 15 and walls 17 and 29 could be preformed and welded to the axle 12.

As illustrated in FIG. 4, an oil pump 31 is located in the sump area 18 of each lobe portion 14, and a pressure sensitive non-return valve 32 is located downstream of each pump. The outlets of valves 32 are interconnected by a passage 33 which in turn is connected to a manifold 34 having one or more outlets located in an upper area of each lobe portion 14. Preferably, as illustrated, an actuatable check valve 35 is located in each of the main passages of the manifold 34 and is operatively connected to means (not shown) such as a level sensor in its respective sump area 18 or to a torque indicating device for a purpose to be hereinafter described. It will be understood that, in practice, at least part of the run of the passage 33 and of the manifold 34 will be accomplished by drilled passages in the walls of the gearcase.

A preferred construction of gear train suitable for installation in the gearcase of FIGS. 1, 2 and 3 is illustrated in FIG. 5. Input shafts 20 from each of two engines (not shown) are connected through a high speed bevel gear 21 to a pinion 22. The bevel gear 21 comprises a first stage speed reduction gear and also serves to turn the axis of rotation of input shaft 20 through approximately 90 degrees. It will be understood that this angle will vary depending on the precise location of the engine or engines and may typically be between 80 degrees and 110 degrees.

Each of the pinions 22 is meshed with two gear wheels 23 and comprises a second stage speed reduction gear of helical involute form.

The gear wheels 23 are rotationally fixed through torsionally flexible quill shafts (not shown) to pinions 24 which are meshed with a single combining gear 25. Preferably, the gear teeth between the four pinions 24 and the combining gear 25 are of conformal shape, thus permitting high ratios of 10:1 or greater to be achieved in this final reduction stage.

FIG. 6 shows the gear train of FIG. 3 incorporated in the gear case 11 illustrated in FIGS. 1 to 3.

As illustrated in FIG. 6, the various gears of each input speed reducing and load dividing gear stage are supported in bearings located in apertures in the web portions 15 and in support plates 16, attached to the flange 30 in the area of each of the diametrically opposed lobe portions 14 of the gearcase 11. The combining gear 25 is rotationally supported externally of the axle 12 by axially spaced-apart ball bearings 26, the upper bearing also acting during operation as a main lift bearing.

An upwardly extending ring 27 is bolted to the combining gear 25 and has an upwardly facing ring of bolt holes 28 to facilitate the attachment of rotor hub (not shown).

It will be seen from FIG. 6 that the extension of the web 15 around the entire circumference of the axle 12 provides, in combination with a single piece cover 19, bolted to flange 30, a housing for the entire extent of the combining gear 25. In contrast, the portions of the curved side walls 17 below the web 15, are localised in the area of the lobe portions 14 to provide the individual oil sump 18 for each of the separate speed reducing and load dividing gear stages.

The integral radially extending apertured flange 13 at the lower end of the axle 12 by which the entire assembly is attached to a helicopter fuselage, is clearly illustrated in FIG. 6.

In operation of the transmission system of this invention, the speed of rotation of the engine input shafts 20 is reduced in the first stage spiral bevel gearing 21 which also serve to turn the axis through approximately 90 degrees. The speed of rotation is further reduced in the second stage comprising pinion 22 and wheels 23, and the provision of two wheels 23 serves to split the input power from each engine into two paths. Power in each path is transmitted through the third stage reduction gear comprising the four pinions 24 and the single combining gear 25. The use of conformal gear teeth on the four pinions 24 and the combining gear 25 enables a high reduction ratio of the order of 10:1 or greater to be achieved and this, together with the split load path arrangement and the use of a first stage spiral bevel reduction gear, ensures that the desired speed reduction can be achieved in three stages only thereby minimising the weight of the rotating components.

Rotation of the combining gear 25 is transmitted through the bolted attachment on ring 27 to the helicopter main sustaining rotor. In operation, lifting loads applied by the rotor are transmitted through the ring 27, the upper bearing 26 and the axle 12 directly in to the helicopter fuselage. The lobe portions 14 of gear case 11 have therefore only to support the speed reduction/divide gear trains so that the respective parts forming the lobe portions 14, i.e. the integral web 15, the curved wall 17 and lower wall 29, need be only of sufficient stiffness to maintain alignment under the action of loads in these gears, i.e. independent of rotor loads. The only gear train affected by rotor loads is the conformal output gear train and since the central stub axle 12 is designed to cater for these loads, gear deflections due to such loads are minimized.

Thus, the gearcase of this invention provides the concept of a direct load path through the single axle 12 to transmit operational loads from the rotor to the fuselage.

Another feature of this invention is the equal spacing of the reduction/divide gear trains around the axis of rotation of the combining gear 25. In the case of the illustrated two-engined embodiment this results in the gear trains being located diametrically opposite, i.e. at 180 degrees spacing; however, a similar facility will be provided in an installation having any number of engines in which case the spacing will be at an angle $\theta = 360/N$ where N equals the number of engines.

Such an arrangement means that under normal flight conditions, the loads on the axle 12 due to one engine will be balanced by the loads due to the other engine(s). This load balancing results in deflections due to one gear train being identical in magnitude but in an opposite direction to deflections in the other train(s) resulting in a zero net deflection which ensures that correct gear alignment is maintained. This significantly reduces the amount by which the gears normally have to be derated to take account of such deflections and results in a further reduction in weight.

It is recognised that the use of the highest possible reduction ratio in the output stage of any gearbox allows a significant reduction in the weight of the other gear stages and results in a net weight saving. Involute gear ratios of around 10:1 are in use in certain fields of engineering; however, a limitation on the ratio obtainable from involute gearing is either the very large wheel diameter or the small number of teeth on the pinion.

Thus, the size of involute pinion teeth is restricted by the shape of the tooth due to inherent characteristics of the generation process and the involute geometry, and a drastic reduction in tooth strength results from undercutting of the tooth profile on pinions having less than 10 teeth.

The high power capacity of the conformal gear tooth form has long been recognised; however, the present invention utilises the more favourable conformal tooth shape to provide smaller numbers of pinion teeth whilst retaining satisfactory strength characteristics. It has been established that pinion tooth numbers as low as five are quite acceptable and this has enabled very high ratios well above 10:1 to be obtained, and within a volume considerably less than an equivalent involute gear train.

Thus, the overall low weight and high reliability of a transmission system constructed in accordance with this invention is obtained as a result of the combined effect of several features any of which may be taken individually to provide a degree of weight reduction and increased reliability.

These features relate to the gear and gearcase design philosophy and the general gear layout which comprises a bevel driven tandem articulated locked train configuration for each engine. The desirable characteristics of this configuration include the location of the bevel gearset at the input to the gearbox where the weight penalty associated with bevel gears is minimised. The incorporation of a high output ratio enables an overall reduction ratio of around 100:1 to be achieved with only three reduction gear stages, including the bevel gearset, to further reduce weight and to increase reliability, and a further advantage of adopting a high ratio output stage is that this weight reduction effect is maximised.

The incorporation of a multi-pinion split load path output stage provides increased torque capacity and results in a further weight reduction for a given output torque.

It became apparent that the incorporation of the described gear lay-out with its relatively large diameter combining gear 25 in a conventional gearcase would have meant that a large proportion of the weight advantages would be lost. This led to an investigation of gearcase design philosophy and resulted in the novel gearcase construction hereinbefore described which incorporates a direct load path through the central stub axle 12, which considerably reduces gearcase weight.

The large diameter of combining gear 25 and the hollow axle 12 results in a relatively large central bore diameter through the gearbox. This is another very desirable feature of the transmission system of this invention since it enables an internal control mechanism to be routed through the transmission with no weight penalty.

The reliability of the transmission system according to the invention is further enhanced by the provision of an individual oil sump 18 for each input gear train. The inclusion of individual oil pumps 31 in each sump 18 means that a multi-lubricating system can be incorporated thereby making each gear train fully self-contained.

The embodiment illustrated in FIG. 4 enhances this facility to further improve the operational flexibility of a gearbox incorporating a gearcase with multi-sumps as hereinbefore described. Thus, in normal operation, lubricating oil is fed from each sump 18 by the respective pumps 31 to the common manifold 34 to lubricate the gear train in each lobe portion 14.

In the event of a loss of oil from one of the sumps 18, the pressure responsive non-return valve downstream of the pump 31 located in that sump will close to prevent lubricating oil in passageway 33 from flowing back through the pump into the damaged sump and being lost. The provision of check valves 35 now provide an option either to continue to supply oil to the gear train in the area of the damaged sump which will result in a loss of further lubricating oil, or to cut off the flow of oil to that gear train to drastically reduce the loss of oil from the damaged sump. Operational conditions will dictate the option taken.

Supposing that the gear train in the lobe portion 14 with the damaged sump 18 is no longer transmitting torque to the main sustaining rotor due for example to failure of its respective external power source or a failure in the gear train itself, then it will be sensible to close the check valve 35 in the part of the manifold 34 supplying that gear train to conserve the supply of lubricating oil in the other sump 18. On the other hand, if the gear train in the lobe portion 14 with the damaged sump 18 is supplying useful torque then operational conditions may dictate that the check valve 35 remains open to provide lubricating oil to ensure continued operation of the gear train in the knowledge that oil supplied to that gear train is probably going to be lost through the damaged sump. This loss will of course be less than would occur in the absence of the non-return valve 32. If, however, operational conditions are such that safe operation can continue without the input of torque from the gear train in the lobe portion 14 with the damaged sump 18, or if conditions subsequently improve to make this possible, then the power source driving that gear train can be shut down and the respective check valve 32 closed to prevent lubricating oil being supplied to that gear train and thereby preserve the available supply for use in lubricating the other, functioning, gear train.

The check valves 35 can be operated automatically in the event of a loss of torque in the respective gear train or they can be actuated by the pilot in response either to a loss of torque in a particular gear train or to an indication of a loss of oil from a particular sump 18 emanating, for example, from a suitable level sensor device.

In an un-illustrated embodiment, the two check valves 35 illustrated in FIG. 4 could be replaced by a single solenoid valve incorporating a flow directing and controlling spool device.

The lubrication system can of course be adapted for use in a gearbox having more than two individual sumps 18 and corresponding input gear trains, for example, by adding an appropriate number of branches each with its check valve 35 to the manifold 34.

What is claimed is:

1. A gearcase for a helicopter transmission including a generally tubular non-rotating stub axle, an output gear rotationally fixed adjacent an upper end of the axle and adapted during operation for connection to a sustaining rotor, attachment means adjacent a lower end of the axle for connecting the gearcase to a helicopter fuselage whereby all operational loads are transmitted through the stub axle directly to the fuselage, a support flange extending generally radially from the stub axle, a hollow casing supported by the support flange and a speed reducing gear train connected with said output gear housed within said hollow casing.

2. A gearcase according to claim 1 wherein the support flange is disposed intermediate the ends of the stub axle, the support flange, the lower portion of the hollow casing and portions of the stub axle forming a sump to contain lubricating oil for the speed reducing gear train.

3. A gearcase according to claim 2 wherein the support flange, the lower portion of the hollow casing and the stub axle are integrally formed.

4. A transmission system as claimed in claim 2, wherein the sump contains an oil pump adapted during operation to circulate lubricating oil around the speed reducing gear train.

5. A transmission system as claimed in claim 1 wherein the speed reducing gear train comprises a first stage spiral bevel reduction gear and a multi-pinion output stage meshed with said output gear.

6. A transmission system as claimed in claim 5, wherein the meshed pinions and the output gear comprise a conformal tooth form.

7. A transmission system as claimed in claim 5 wherein the output stage of said speed reducing gear train has a reduction ratio of 10:1 or greater.

8. A transmission system as claimed in claim 1 wherein the stub axle comprises an upright frustum of a cone.

9. A helicopter transmission system for driving a main sustaining rotor from a plurality of external power sources comprising a gearcase, a generally tubular non-rotating stub axle in said gearcase, a support flange extending radially from the stub axle, a hollow casing supported by the support flange and forming upper and lower compartments above and below the support flange, an output gear rotationally mounted on the outer surface of the stub axle adjacent the upper end thereof within the upper compartment formed by said hollow casing, an input gear train for each external power source, each input gear train located within an upper gear case compartment, each input gear train being meshed with said output gear, means on said output gear for connection to a rotor hub of the main sustaining rotor, at least one sump in the lower gear case compartment for providing lubricating oil for the input gear train, and attachment means adjacent a lower end of the stub axle for connecting the gearcase to a helicopter fuselage whereby all operational loads are transmitted through the stub axle directly to the fuselage.

* * * * *